Figure 1:
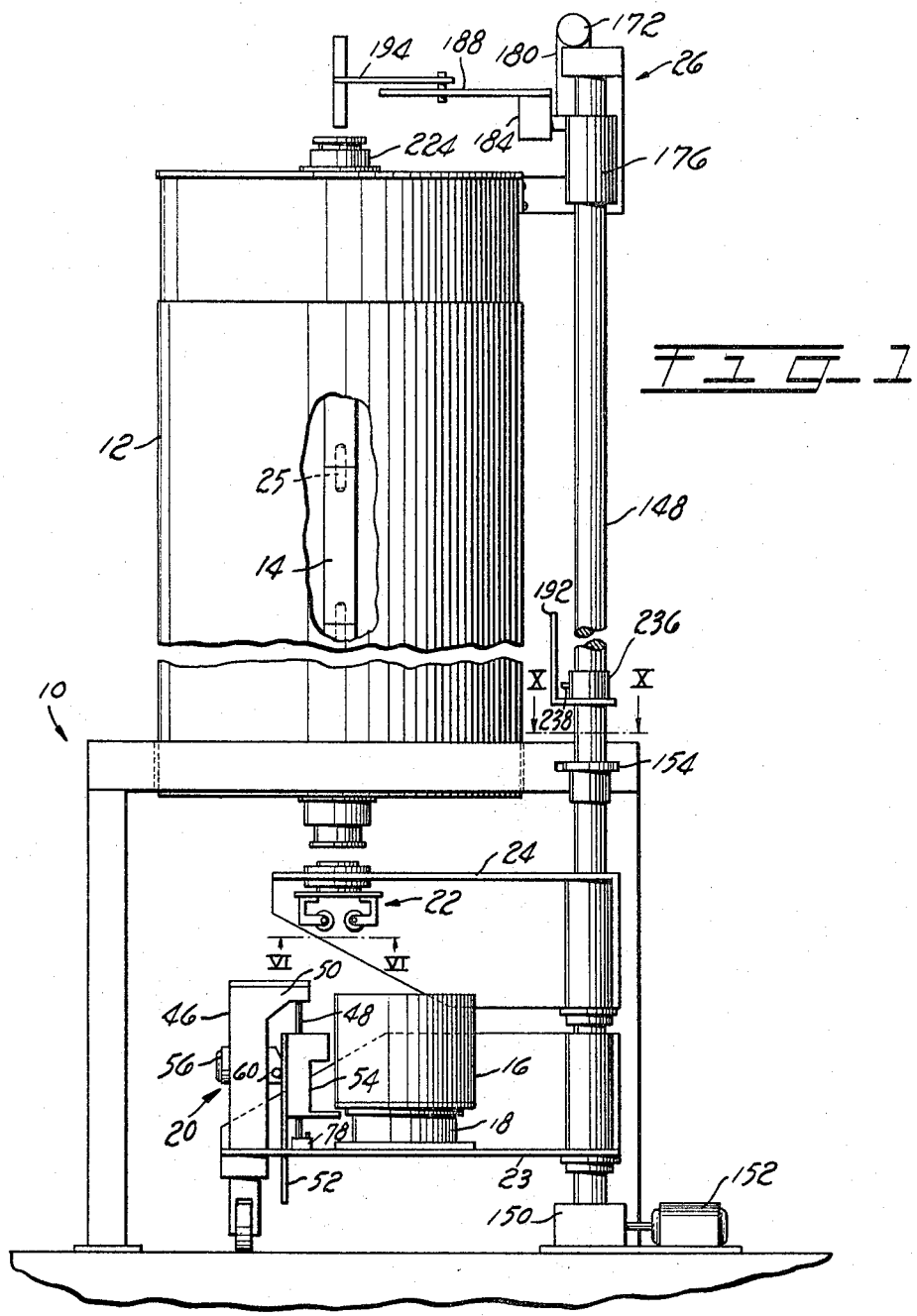

May 7, 1968   W. L. JOHNSON   3,381,657
CARBON DEPOSITION FURNACE
Filed Feb. 18, 1966   8 Sheets-Sheet 1

INVENTOR
W. L. JOHNSON
By A. J. Nugent
ATTORNEY

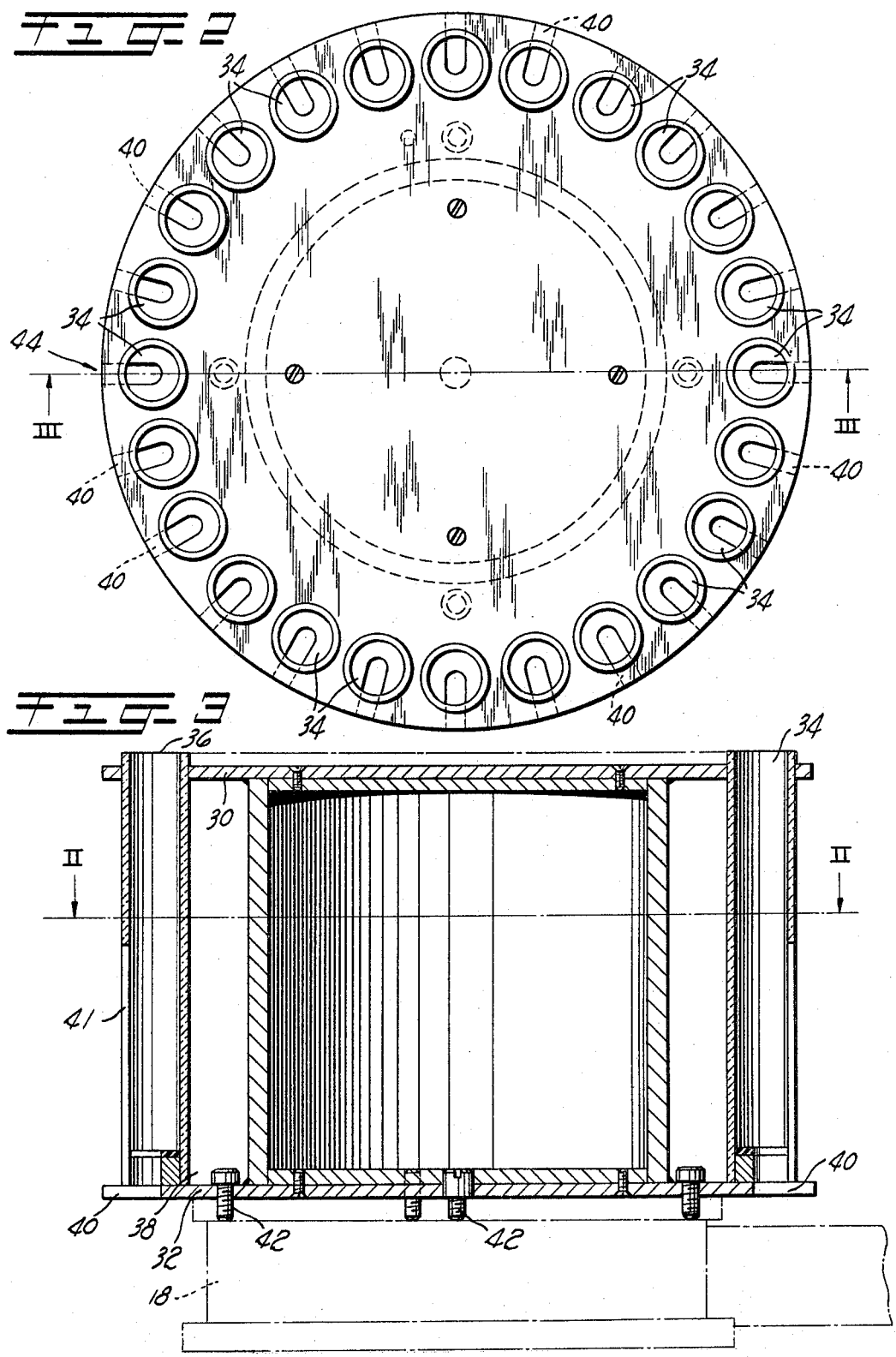

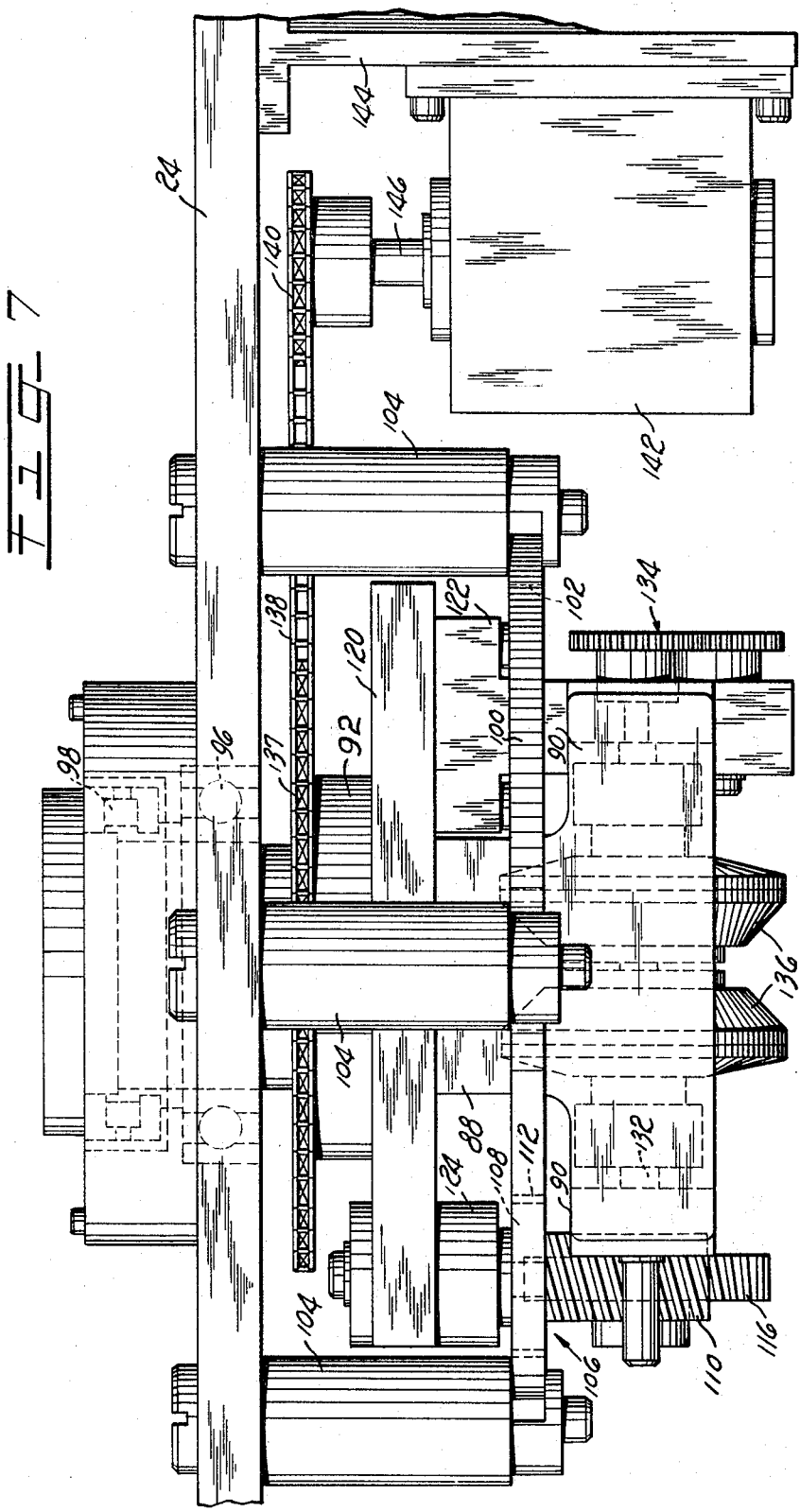

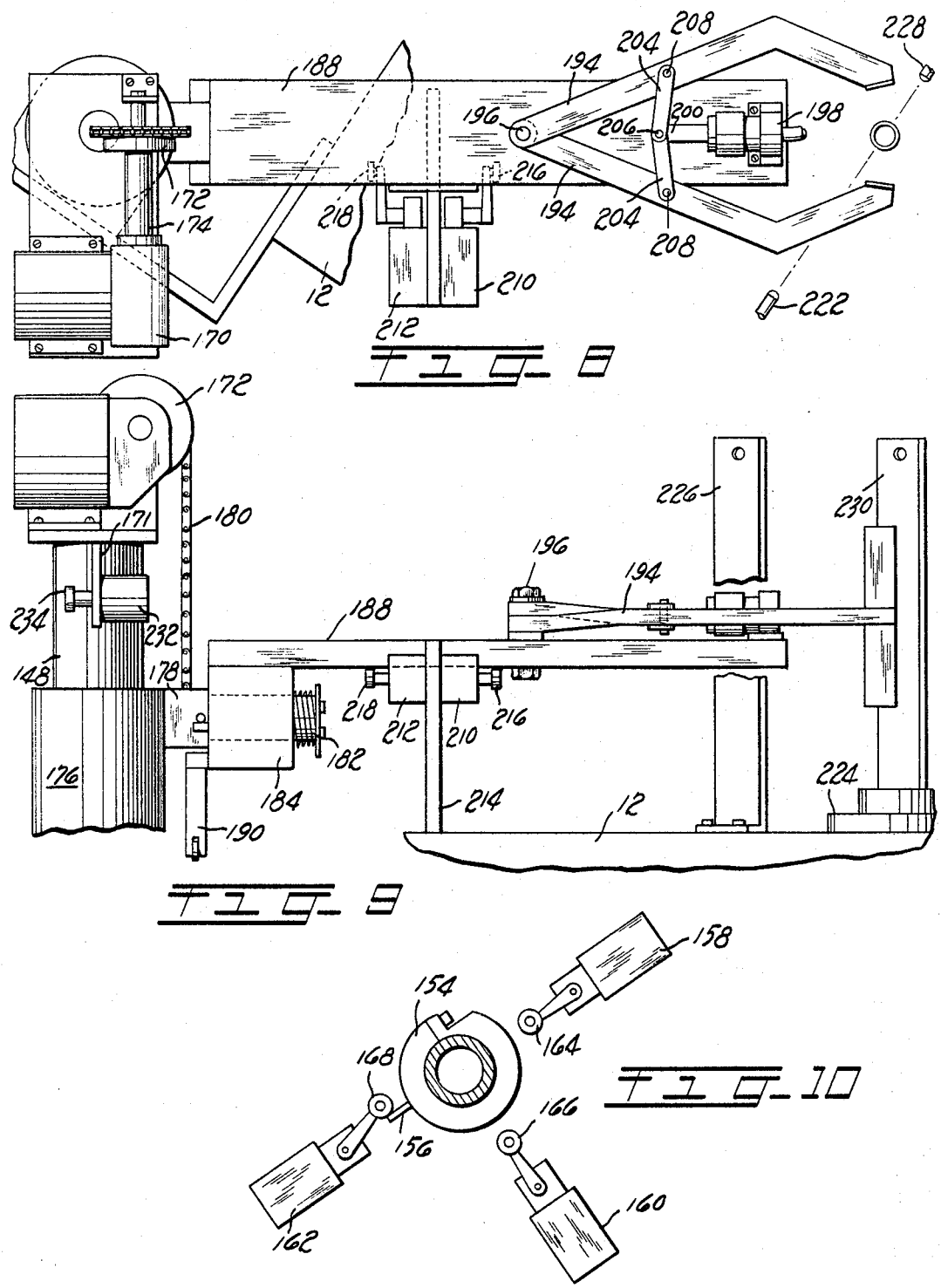

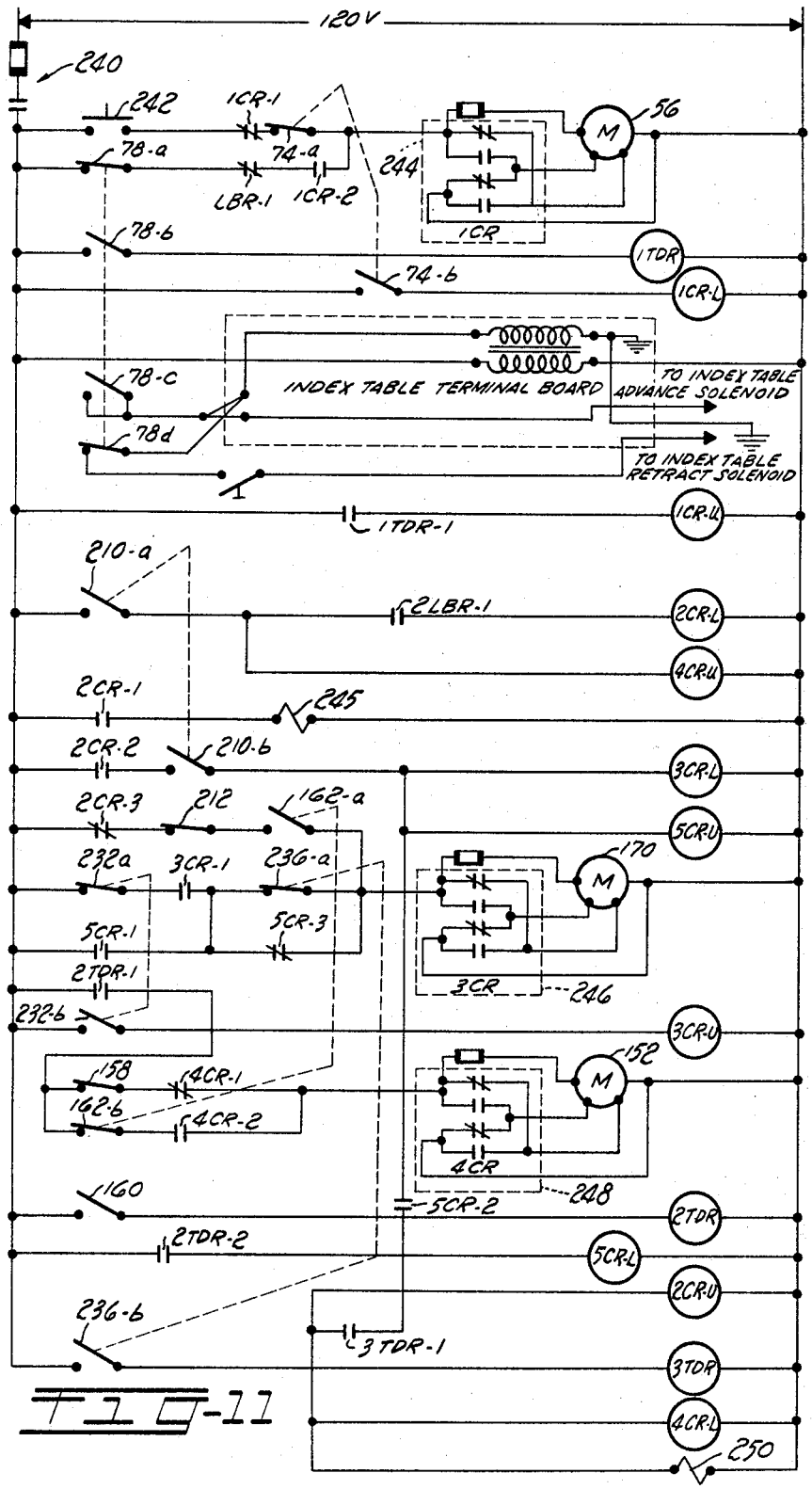

United States Patent Office 3,381,657
Patented May 7, 1968

3,381,657
CARBON DEPOSITION FURNACE
Walter L. Johnson, Plaistow, N.H., assignor to Western Electric Company, Incorporated, New York, N.Y., a corporation of New York
Filed Feb. 18, 1966, Ser. No. 528,622
10 Claims. (Cl. 118—2)

This invention relates generally to apparatus for feeding blanks to a treating area, and removing them therefrom. More particularly, the invention relates to the manufacture of carbon deposited resistors wherein cores are fed to a carbon deposition furnace and the coated cores are removed therefrom.

Due to the large volume in which electrical components are utilized in the electrical equipment industry, improvements in the efficiency of the manufacturing process have a great impact on the commercial attractiveness and competitive position of the component involved. Transforming a process from batch type to automatic, for example, so that the process may be continuously performed with a minimum of labor will lead to such increases in efficiency, and, therefore, those skilled in the art have been striving in this direction for a good number of years.

In the manufacture of carbon deposited resistors, carbon is applied to a ceramic core in a furnace by decomposing methane gas in the absence of oxygen. To achieve the decomposition of the methane, temperatures of over 1,700° F. must be attained. At approximately that temperature, the methane is cracked, forming carbon particles which adhere to the heated surface of the ceramic cores.

To effectively adjust the carbon coated core to a particular resistance value, the coating of carbon should be unbroken and uniform. Therefore, the cores should be disposed in the furnace without the periphery thereof being gripped. In addition, the cores must be rotated while they are in the furnace to avoid a deleterious streaky deposition of carbon. To automate such a process presents certain difficulties. A succession of cores must be advanced through the furnace in a self-supporting manner and rotated at the same time. This is only practical in a vertical arrangement.

The necessity of a vertical arrangement and the nature of the carbon deposition furnace results in a demand for a furnace height that often exceeds twelve feet. This presents problems in handling the finished cores that emerge from the top of the furnace and transporting them to a collection area. Also, the feeding of each core to the furnace must be precisely timed so that each core enters the furnace so as to support the cores above it.

An object of the invention is to provide apparatus for rapidly and automatically feeding a succession of blanks, such as resistor cores, through a vertically mounted furnace.

Another object of this invention is to provide apparatus for continuously advancing a succession of cores through a deposition furnace while imparting a rotary movement thereto.

A further object of this invention is to provide apparatus for engaging each core as it emerges from the furnace, removing it therefrom, and depositing it gently into a receptacle.

In accordance with the objects, the apparatus includes a treatment compartment such as a carbon deposition furnace, an indexable magazine assembly adapted for supporting a plurality of cores therein, a drive assembly for advancing a succession of cores through the treatment area in successive abutting relationship while imparting rotary motion thereto, a feeding assembly for removing cores from the magazine and inserting them into the drive assembly, and an elevator and pickup assembly for engaging the finished products emerging from the treatment area and transferring them gently to a collection area.

Figure 4:
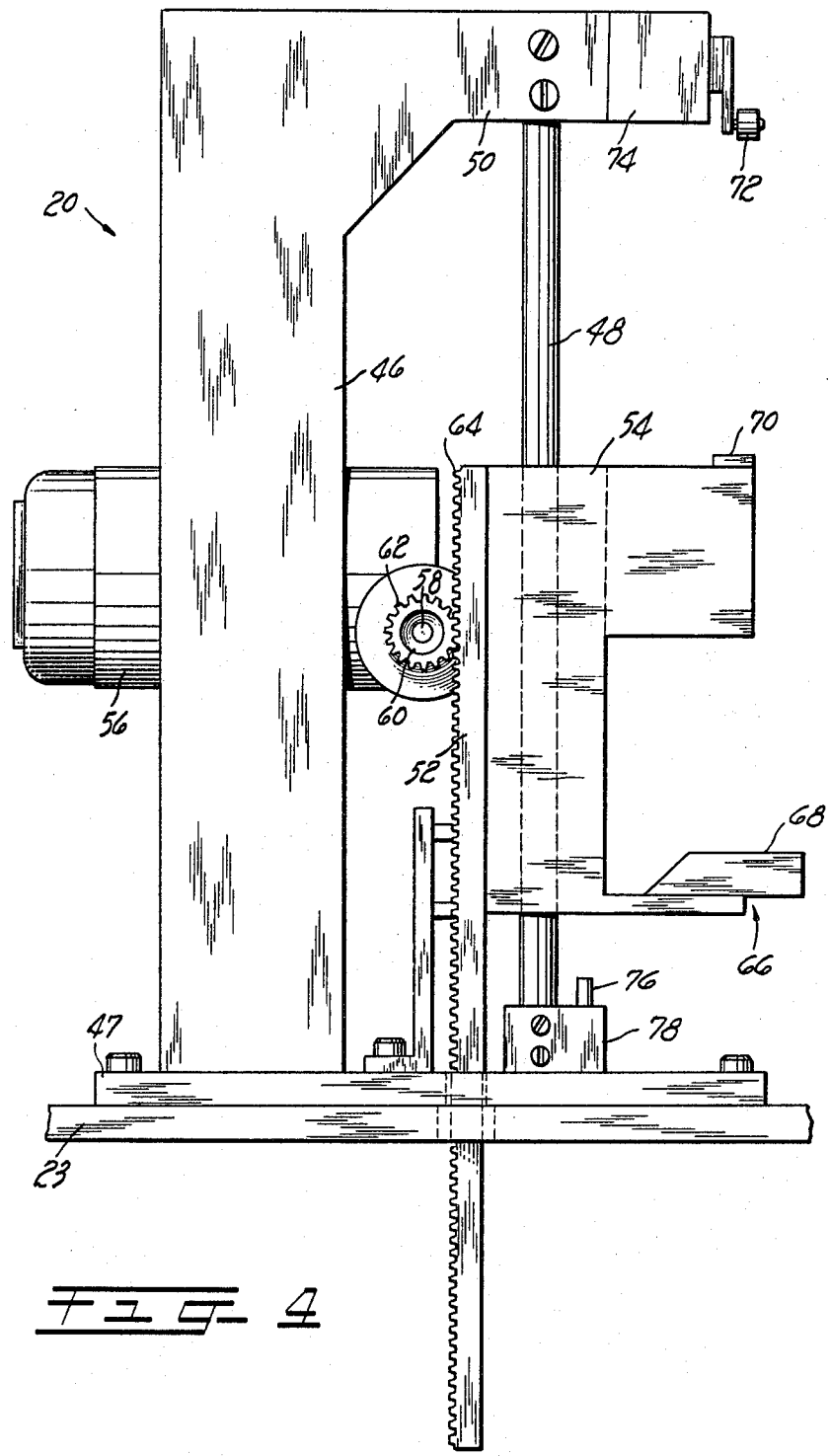
Figure 5:
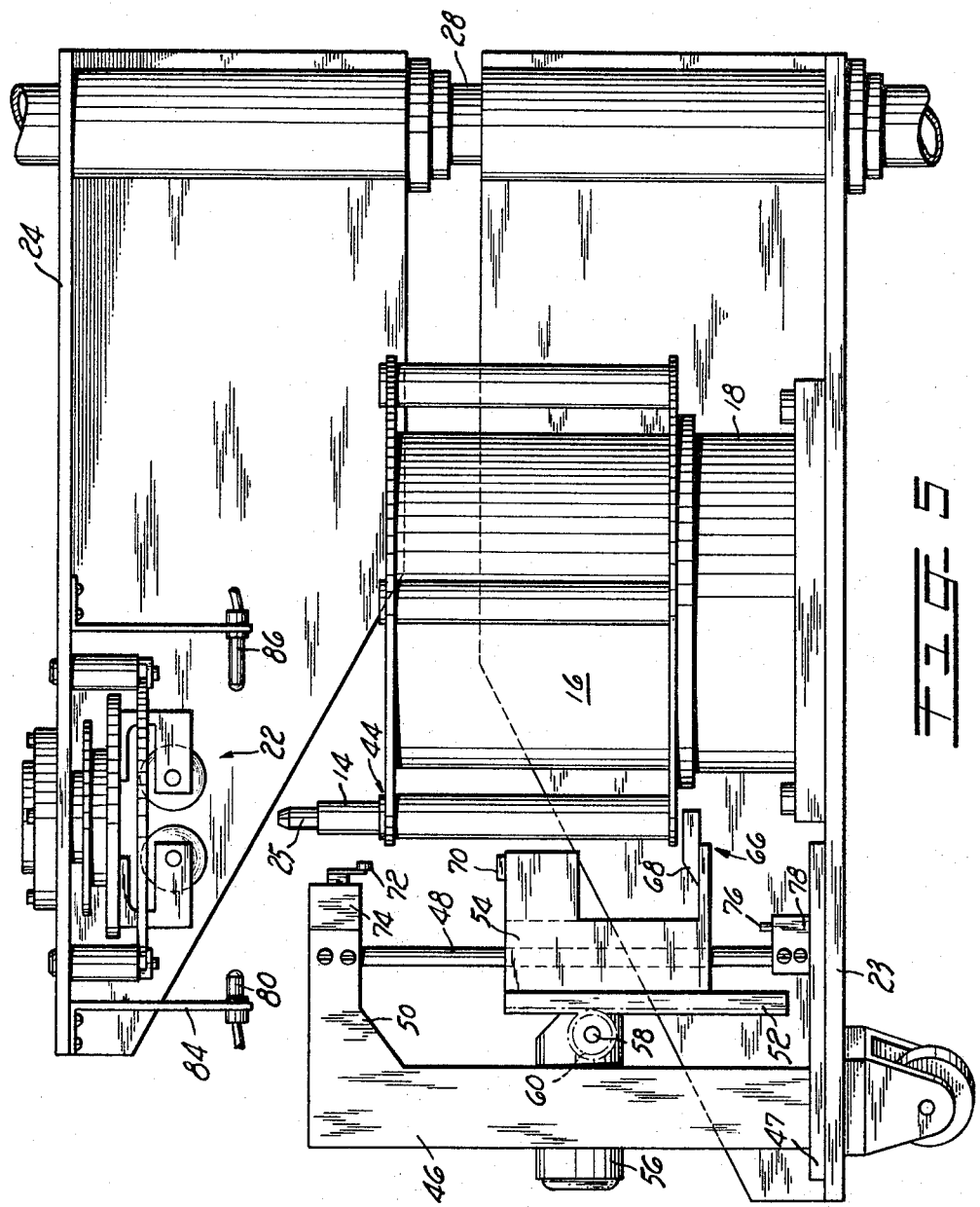
Figure 6:
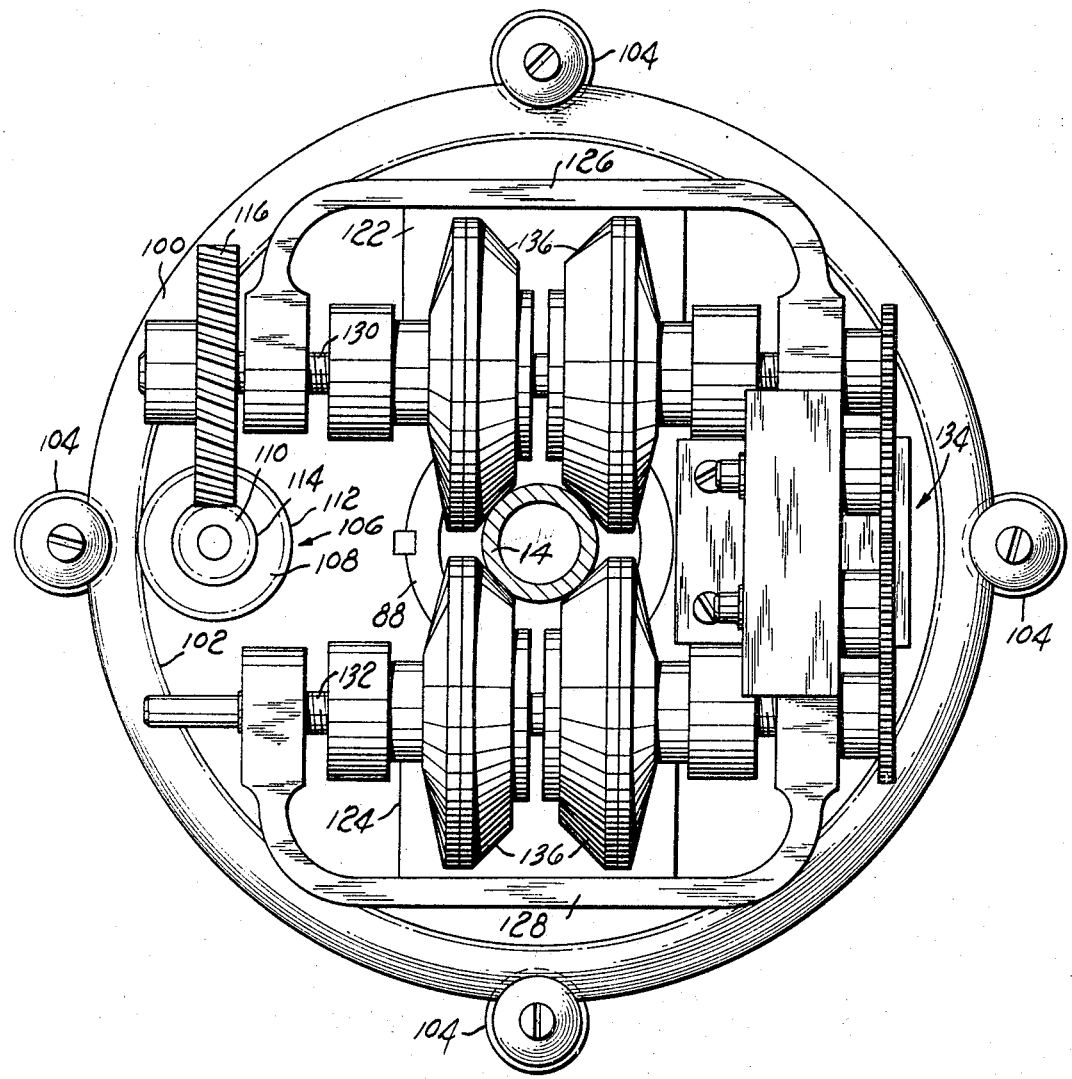

These and other features, advantages and objects of the invention will be understood clearly from the following detailed description and the accompanying drawings wherein:

FIG. 1 is an elevation view of a preferred embodiment of the invention showing the various assemblies thereof;
FIG. 2 is a cross sectional view of a core magazine assembly taken on lines II—II of FIG. 3;
FIG. 3 is a sectional view of the core magazine assembly taken on lines III—III of FIG. 2;
FIG. 4 is an elevation view of a core feeding assembly;
FIG. 5 is a side view of the core feeding assembly, the magazine, and a drive assembly for advancing cores fed thereto through the furnace, showing the relationship therebetween;
FIG. 6 is a bottom view of the drive assembly looking from lines VI—VI on FIG. 1;
FIG. 7 is a sectional view of the drive assembly;
FIG. 8 is a plan view of an elevator and pickup assembly for finished components emerging from the furnace;
FIG. 9 is a front view of the elevator and pickup assembly;
FIG. 10 is a view of a limit switch layout, which is part of the control circuit of the invention, taken along line X—X of FIG. 1; and
FIG. 11 is a schematic wiring diagram for the invention.

With reference to FIG. 1 of the drawing, a preferred embodiment of the invention comprises, generally, a frame 10 on which is mounted a pyrolitic vertical furnace 12 for depositing carbon on ceramic cores 14. The cores 14 are stored in a magazine 16 which is mounted on an indexing table 18. A feeding assembly 20 removes cores 14 one at a time from magazine 16 and inserts them into a drive assembly 22. Magazine 16 and feeding assembly 20 are mounted on a swing out support 23, and the drive assembly is mounted on a swing out support 24 to enable them to be rotated out from beneath the furnace for maintenance purposes. Cores 14 are stored in magazine 16 with removable mounting pins 25 inserted into the top of each core. The cores may be vertically stacked by insertion of the pin 25 of one core into the bottom of a preceding core. In this manner, drive assembly 22 is operable to advance a succession of cores 14 fed thereto from magazine 16 upwardly through furnace 12. An elevator and pickup assembly 26 is operable to engage cores exiting from the top of furnace 12 and transfer them to a collection area (not shown) at or near ground level.

With reference to FIGS. 2 and 3, the magazine assembly 16 comprises top and bottom plates 30 and 32, respectively, with a plurality of core receiving tubes 34 supported therebetween. Tubes 34 are completely open at their upper ends 36, with bottom plate 42 closing off the bottom ends 38 thereof except for a slot 40 in each tube. In addition, a slot 41 is provided in the side of each tube, the purpose of which slots will be discussed below. Bottom plate 32 is connected to indexing table 18 by means of a plurality of screws 42.

Each increment of rotation of indexing table 18 is equal to the distance between the centers of tubes 34 so that, upon each indexing movement, a new tube 34 arrives at a predetermined position designated 44 in FIG. 2.

Feeding assembly 20 is mounted adjacent magazine assembly 16. With reference to FIG. 4, feeding assembly 20 includes a frame 46 mounted on a base 47, which is mounted in turn on swing out support 23. A shaft 48 is mounted between a horizontally extending portion 50 of frame 46 and the swing out assembly. A rack 52 is slidably mounted in base 47, and a core insertion member 54 is both connected to rack 52 and mounted for slidable motion on shaft 48. A first reversible electric motor 56 is mounted to frame 46, positioned such that its drive shaft 58 is perpendicular to shaft 48. A pinion gear 60 is mounted on drive shaft 58 with its gear teeth 62 engaging the rack teeth 64 such that activation of motor 56 will cause vertical motion of the core insertion member 54 on shaft 48. Core insertion member 54 includes an elevator lever 66 having an upper member 68.

As seen in FIG. 5, elevator member 68 is disposed relative to magazine 16 such that it is adapted, upon energization of motor 56, to rise through a slot 40 of bottom plate 32, engage a core disposed within tube 34 which is in position 44, continue its upward movement along slot 41, lifting the core out of the open top of the tube to the drive assembly 22. Core insertion member 54 also includes a projecting member 70 which is adapted to engage the actuating member 72 of a microswitch 74 at the upper end of its stroke. The bottom of elevator lever 66 is adapted to engage the actuating member 76 of a microswitch 78 at the bottom of its stroke.

A tubular light source 80 is suspended from support 24 by a bracket 84. A photocell 86 is suspended from the support 24 in spaced relationship with light source 80. As seen in FIG. 5, the photocell and light source are positioned on opposite sides of the path of a core being lifted from magazine 16 to drive assembly 22 so as to be operable to detect both when a core is lifted out of the magazine, and when it is substantially lifted into the drive assembly.

With reference to FIGS. 6 and 7, drive assembly 22 includes a shaft 88 having a collar 90 at one end thereof, shaft 88 being rotatably mounted in swing out support 24, and an additional support 92. Bearings 96 and 98 are provided to facilitate the rotary motion of the shaft. A ring gear 100 having internal teeth 102 is fixedly mounted in a plurality of mounting members 104 which in turn are mounted to support 24. A spur gear 106 having an upper section 108 and a lower section 110 is rotatably mounted in shaft collar 90 and is positioned thereon such that teeth 112 of the upper section meshes with ring gear teeth 102 and the teeth 114 of the lower section mesh with a vertically disposed worm gear 116.

A mounting plate 120 is mounted on shaft 88 and is rotatable therewith. Two friction drive supports 122 and 124 are connected to mounting plate 120, and include arms 126 and 128 adapted to receive shafts 130 and 132, respectively, therein. Shaft 130 is connected to worm gear 116 and rotated in a clockwise direction by the rotation thereof. Shaft 132 is driven off shaft 130 through a gear assembly 134, which is arranged such that shaft 132 is driven in a counterclockwise direction. A pair of friction drive rollers 136 are mounted on each shaft 130 and 132 such that they cooperate to advance a core held therebetween as shown in FIG. 6.

Rotary movement is imparted to shaft 88 through a gear sprocket 137 mounted thereon. Sprocket 137 is driven by a chain 138 which is connected to another sprocket 140. A motor 142, mounted to swing out support 24 by a bracket 144, drives sprocket 140 from its drive shaft 146.

The rotary motion of gear sprocket 137 turns shaft 88 in a clockwise direction causing the entire mechanism shown in FIGS. 6 and 7, except ring gear 100, to rotate in that direction. As spur gear 106 is advanced around ring gear 100, it turns worm gear 116 which causes the clockwise rotation of shaft 130 and, through gear assembly 134, the counterclockwise rotation of shaft 132. This causes the rotation of friction drive rollers 136 in the direction shown by the arrows marked thereon, resulting in the upward movement of a core 14 held therebetween. Simultaneously with the advancement of the core by rollers 136, the core is also being rotated due to the rotation of the entire mechanism within ring gear 100. This dual motion of the cores through the furnace is essential since the rotary movement leads to an even coating of carbon on the cores, which just a straight vertical motion would lead to an unsatisfactory streaky deposition of carbon.

The stroke of elevator lever 66 is of predetermined lengths such that the periphery of the upper end of a core lifted from the magazine is engaged by the friction rollers 136. Also, the interval between the strokes of the elevator lever is timed to allow a preceding core to be advanced upwardly by rollers 136 one core length, so that a subsequent core may be lifted into the drive assembly with its pin 25 being received in the bottom of the preceding core. Therefore, as successive cores 14 are fed from magazine 16 to drive assembly 22, they are stacked in a vertical manner by the insertion of pins 25 of a succeeding core into the bottom of the hole in the preceding core, and the stack is advanced vertically through the furnace by the rotary action of friction drive rollers 136 on the bottommost core.

With reference to FIGS. 1, 8 and 9, the elevator and pick-up assembly 26 is operable to engage a core emerging from the top of furnace 12, remove it from the stack, transfer it to a collection area, and return to pick up the next core. The pick-up assembly is mounted on a column 148 which is rotatable in both directions by a drive assembly 150 which is powered by a second reversible motor 152. A limit switch cam 154 having an actuating member 156 is fixedly mounted to column 148 near the bottom thereof (FIG. 1) so as to rotate therewith. Microswitches 158, 160 and 162 are mounted adjacent limit switch cam 154 as shown in FIG. 10 so that their actuating buttons 164, 166 and 168, respectively, are engageable with actuating member 156.

A third reversible motor 170 is mounted to a bracket 171 at the top of column 148 (FIG. 9) for driving a sprocket gear 172 mounted to its drive shaft 174. A sleeve 176 having a flange member 178 at the top thereof is mounted for slidable movement on column 148. A chain 180 mounted on sprocket gear 172 is connected at one end thereof to flange member 178, with the other end thereof being connected to a counter-weight (not shown) suspended thereby in the interior of column 148, so that sleeve 176 may be raised and lowered on elevator column 148 by rotation of sprocket gear 172 by motor 170.

A housing 184 is rotatably mounted to a shaft 182 projecting from flange member 178. A clamping jaw support 188 is fixedly mounted to housing 184 so as to reciprocate on elevator column 148 with sleeve 176. A pivot arm 190 is fixedly mounted on housing 184 and a pivot bracket 192 is mounted on elevator column 28 in spaced relationship with pivot arm 190 as shown in FIG. 1, the operation of which will be explained below.

A pair of clamping jaws 194 are connected to the top of support 188 by a pivotal mount 196. An air cylinder 198 having a pivot block 200 attached to the piston rod (not shown) thereof, is mounted in spaced relationship to pivotal mount 196. A pair of toggle arms 204 are pivotally mounted to the top of support 188 and pivot block 200 by a toggle arm pin 206 with one toggle arm being connected to each clamping jaw by a pivotal mount 208 so the clamping arms 194 may be pivoted toward and way from each other upon actuation of air cylinder 198.

Two microswitches, 210 and 212, are mounted to the top of furnace 12 by a bracket 214 such that their actuating members 216 and 218, respectively, are in spaced relationship with the bottom of clamping jaw support 188. A tubular light source 222 is mounted to the top of furnace 12 adjacent its upper seal assembly 225 by a standard 226. A photocell 228 is mounted on a standard 230 opposite light source 222 on the other side of the upper seal assembly for detecting when a core emerging from the furnace 12 through upper seal assembly 224 has reached a predetermined point, whereupon the elevator and pickup assembly will be activated.

A microswitch 232 is mounted to bracket 171 in a position such that its actuating member 234 is in spaced relationship with the top of sleeve 176, and another microswitch 236 is mounted on pivot bracket 192 with its actuating button 238 in spaced relationship with the bottom of sleeve 176 (see FIG. 1).

The apparatus is integrated into an automatic machine by an electric circuit 240 shown schematically in FIG. 11. The feeding cycle is initiated by depressing a push button 242, which energizes reversible motor 56 through a normally closed contact 1CR–1 of a relay 1CR and a normally closed contact 74–a of microswitch 74. Motor 56 is driven in its first direction through the normally closed contacts of relay 1CR in contact assembly 244, and core insertion member 54 is driven upwardly thereby on shaft 48, causing elevator lever 66 to enter a slot 40 in bottom plate 32 and lift a core 14 upwardly out of a tube 34 in magazzine 16. Just after the upward movement of the core starts, the leading end thereof will break the beam of light from tubular light source 80 to photocell 86, thereby activating a relay LBR (not shown), opening its normally closed contact LBR–1. The upward movement of lever 66 continues until the upper end of the core is inserted into rollers 136—136 of drive assembly 22 and projecting member 70 of the core insertion member 54 strikes the actuating member 72 of microswitch 74. This opens contact 74–a, deenergizing motor 56 and closes contact 74–b, energizing relay 1CR.

Relay 1CR and all the other relays of circuit 240 are separately energized and de-energized. For example, when contact 74–b is closed, current is sent through element 1CR–L which energizes relay 1CR. Relay 1CR remains energized, even when current is removed from element 1CR–L by the opening of contact 74–b, until current is sent to element 1CRU, which is separately wired.

Energization of relay 1CR closes normally open contact 1CR–2 and alters the pattern in contact assembly 244, preparing motor 56 to be driven in its other direction for the downward travel of core insertion member 54. When the core is advanced past tubular light source 80 by drive assembly 22, relay LBR is de-energized, allowing contact LBR–1 to close, which energizes motor 56 to drive core insertion member 54 downward. Insertion member 54 descends until it hits actuating member 76 of microswitch 78, closing its normally open contacts 78–b and 78–c and opening its normally closed contacts 78–a and 78–d. The opening of contact 78–a de-energizes motor 52, while closure of contact 78–b energizes a timing relay, 1TDR, closure of contact 78–c energizes the index table advance solenoid which causes indexing table 18 to rotate a new core into position in spaced relationship with drive assembly 22. When relay 1TDR times out after the indexing movement is completed, contact TDR–1 closes, energizing element 1CR–U, de-energizing relay 1CR which allows contact CR–1 to close, contact CR–2 to open, and contact assembly 244 to return to normal. Closure of contact CR–1 re-energizes motor 56, since button 242 remains down, and the cycle now repeats, feeding another core from magazine 16 to drive assembly 22.

Referring now to FIGS. 9 and 10, along with FIG. 11, the elevator and pick-up assembly operates along with the column drive assembly as follows: At the start of a cycle the bottom of clamping jaw support 184 is resting on the actuating members 216 and 218 of microswitches 210 and 212, respectively. Therefore, normally closed switch 212 is open, and normally open contacts 210–a and 210–b of switch 210 are closed. Also, elevator column 148 is in its furthest clockwise position, and actuating member 156 of limit switch cam 154 is depressing actuating button 168 of microswitch 162. Therefore, normally open contact 162–a is closed, and normally closed contact 162–b is open.

When a core emerges from the upper seal assembly 224 of furnace 12, it breaks the light beam extending from tubular source 222 to photocell 228, energizing a light relay 2LBR (not shown), which closes normally open contact 2LBR–1, activating element 2CR–1 which energizes relay 2CR. Energization of relay 2CR closes normally open contacts 2CR–1 and 2CR–2 and opens normally closed contact 2CR–3. Closure of contact 2CR–1 activates a solenoid 245 which energizes air cylinder 198 and causes the retraction of pivot block 200, causing clamping jaws 194 to pivot into gripping engagement with the core 14. Closure of contact 2CR–2 activates element 3CR–L, energizing relay 3CR, which closes the normally open contacts in contact assembly 246, preparing motor 170 for driving sleeve 176 upwardly on elevator column 148. Closure of normally open contact 3CR–1 energizes motor 170, which drives sleeve 176 upwardly until the leading edge thereof engages actuating button 234 of microswitch 232, opening contact 232–a and closing contact 232–b. Sleeve 176 is driven upwardly at a higher velocity than that at which the cores are being vertically driven by rollers 134—134, so clamping jaws 194—194 are operable to remove the emerging core from the pin 25 of the core below.

The opening of contact 232–a deenergizes motor 170. Closure of contact 232–b activates element 3CRU, de-energizing relay 3CR, which allows normally open contact 3CR–1 to open, and de-activates motor 170, and returns contact assembly 246 to normal, preparing motor 170 for driving sleeve 176 downward. In addition, closure of contact 232–b energizes motor 152 through normally closed switch 158, normally closed contact 4CR–1 and the normally closed contacts of a contact assembly 248. The normally closed contacts of assembly 248 cause motor 152 to rotate the elevator column in a counterclockwise direction. As the rotational movement of elevator column 148 starts, actuating member 156 of limit switch cam 154 moves away from microswitch 162, opening its normally open contact 162–a and closing its normally closed contact 162–b. After a quarter turn of the column, actuating member 156 strikes actuating member 166 of normally open impulse switch 160, which can only be closed by actuating member 156 during the counterclockwise rotation of elevator column 148. The closure of impulse switch 160 energizes timing relay 2TDR, which after ten seconds closes normally open contacts 2TDR–1 and 2TDR–2. At the end of an additional quarter turn of rotational movement of elevator column 28, actuating member 156 strikes actuating member 164 of normally closed switch 158, opening it, which shuts off motor 152.

Closure of contact 2TDR–2 activates element 5CR–L, energizing relay 5CR, which causes the closure of normally open contacts 5CR–1 and 5CR–2, and the opening of normally closed contact 5CR–3. Closure of contact 5CR–1 re-energizes motor 170 through normally closed contact 236–a of microswitch 236, resulting in sleeve 176 being driven downwardly with the core still being held in clamping jaws 194—194. When sleeve 176 starts downward, normally closed contact 232–a of microswitch 232 closes, and normally open contact 232–b opens. After 10 seconds, relay 2TDR times out, and contacts 2TDR–1 and 2TDR–2 reopen. As sleeve 176 nears the bottom of elevator column 148, pivot arm 190 on housing 184 engages pivot bracket 192, and the continued downward motion of sleeve 176 causes pivot arm 190 to be rotated, rotating housing 184 90°, the clamping jaw support 188 rotating therewith. This causes jaws 194 to be disposed parallel to the ground.

The travel of sleeve 176 down elevator column 148 continues until the bottom edge of the sleeve strikes actuating button 238 of microswitch 236, opening normally closed contact 236–a which shuts off motor 170, and closing normally open contact 236–b which energizes timing relay 3TDR, activates element 2CRU, de-energizing relay 2CR, activates element 2CRU, de-energizing relay 2CR, and activates solenoid 250. Activation of the latter solenoid energizes air cylinder 198 causing the clamping jaws to open, releasing the core into a collection area.

Energization of relay 3TDR causes the closure of normally open contact 3TDR-1, which activates elements 3CR-L and 5CR-U, energizing relay 3CR and de-energizing relay 5CR, whereupon contacts 3CR-1 and 5CR-3 close, contacts 5CR-1 and 5CR-2 open, and the contacts of assembly 246 reverse to prepare motor 170 for driving sleeve 176 upwardly. Activation of element 4CR-L energizes relay 4CR, opening normally closed contact 4CR-1, closing normally open contact 4CR-2 and reversing the pattern of contact assembly 248 to prepare motor 152 for driving elevator column clockwise.

De-energization of relay 2CR allows contacts 2CR-1 and 2CR-2 to open and 2CR-3 to close. Motor 170 is now energized through closed contacts 232-a, 5CR-3 and 3CR-1 to raise sleeve 176 up the elevator column. As sleeve 176 starts to rise, contact 236-a closes and contact 236-b opens. Shortly thereafter, pivot arm 190 disengages from pivot bracket 192, restoring clamping jaws 194 to their vertical position. Sleeve 176 travels back up column 148 until the top thereof strikes actuating button 234 of switch 232, opening its normally closed contact 232-a and closing its normally open contact 232-b. Closure of the latter contact activates element 3CR-U, de-energizing relay 3CR, which allows contact 3CR-1 to open and contact assembly 248 to revert to its normal pattern, preparing motor 170 for driving sleeve 176 downward. In addition, closure of contact 232-b energizes motor 152 through closed contact 162-b and closed contact 4CR-2, causing the clockwise rotation of elevator column 176 180°.

As the column starts rotating, actuating member 156 of limit switch cam 154 moves away from switch 158, opening the same. After 180° of rotation, motor 152 is turned off by the engagement of actuating member 168 of microswitch 162 by actuating member 156, opening contact 162-b and closing contact 162-a. Closure of contact 162-b energizes motor 170 through closed contact 2CR-3 and closed switch 212, causing the lowering of sleeve 176. As the sleeve moves away from microswitch 232, contact 232-a closes and contact 232-b opens. Sleeve 176 descends until the bottom of clamping jaw support 188 engages actuating members 216 and 218 of microswitches 210 and 212, respectively. This causes the opening of switch 212, the shutting off motor 170, and the closing of contacts 216-a and 216-b. Closure of contact 216-a energizes element 4CRU, de-energizing relay 4CR which closes contact 4CR-1, opens contact 4CR-2, and prepares contact assembly 248 for the counterclockwise rotation of motor 152, and the cycle is ready to repeat when a new core emerges from the furnace and breaks the light beam from the tubular source.

In this manner the successive finished components emerging from the top of the vertical furnace, which is substantially above ground level, are removed from the self-supporting stack of cores and quickly transferred down to a collection area into which they are gently dropped. It may be noted that the components are still extremely hot when emerging from the furnace, and that the instant apparatus effects the removal therefrom without the necessity of an operator being stationed nearby. Thus, the entire process is automatic.

It is to be understood that the above-described arrangements are simple illustrative examples of the application of the principles of the invention. Numerous other arrangements may be readily devised by those skilled in the art, which will embody the principles of the invention and fall within the spirit and scope thereof.

What is claimed is:

1. Apparatus for treating articles, which comprises:
   a treatment compartment,
   a magazine adapted to support a plurality of articles therein,
   a drive assembly for advancing a succession of articles upwardly through the treatment compartment,
   a feeding assembly mounted in spaced relationship with both the drive assembly and the magazine operable to remove articles from the magazine and insert them in the drive assembly,
   an article removal assembly mounted adjacent the top of the treatment compartment operable to engage treated articles emerging from the compartment for transfer to a collection area,
   said article removal assembly including a column rotatably mounted in spaced relationship with the treatment compartment,
   a sleeve mounted for reciprocal motion on the column, means mounted on the sleeve operable to be moved into gripping engagement with a blank emerging from the furnace,
   detecting means mounted on the treatment compartment operable to detect when a blank emerging therefrom has reached a predetermined point, and
   means responsive to activation of the detection means for activating said gripping means.

2. Apparatus as in claim 1 wherein:
   the drive assembly is operable to impart rotary motion to the articles as they are advanced through the treatment compartment.

3. Apparatus as in claim 1, wherein:
   the rectilinear movement imparted to an article by the drive assembly is coordinated with the feeding assembly cycle such that the latter assembly feeds an article to the drive assembly each time the drive assembly advances an article one blank length, the succession of articles, therefore, being driven through the treatment compartment in successive abutting relationship.

4. Apparatus as in claim 3, wherein:
   each article has a passageway therein, and
   a pin is removably mounted in one end of the passageway of each article with a portion of the pin protruding past the end of the article, whereby the protruding portion of the pin of a succeeding article may be inserted into the passageway of the preceding article when the succeeding article is inserted into the drive assembly.

5. Apparatus for fabricating carbon deposited resistors which comprises:
   a carbon deposition furnace,
   a rotatable magazine mounted on the furnace and adapted to advance a plurality of cores supported therein to a predetermined station,
   drive means mounted on the furnace in spaced relationship with said predetermined station operable to advance a succession of cores through the furnace,
   feeding means mounted in spaced relationship with both the drive assembly and the rotatable magazine operable to remove cores from the predetermined station of the rotatable magazine and insert them into the drive means,
   a removal assembly mounted on the furnace operable to engage carbon coated cores emerging from the furnace, for transportation to a collection area,
   detecting means mounted on the furnace operable to detect when a core emerging therefrom has reached a predetermined point, and
   means responsive to the detection of a core at said predetermined point for activating the removal assembly.

6. Apparatus as in claim 5, wherein the removal assembly further includes:
   a column mounted in spaced relationship with the furnace,
   a sleeve, to which the core gripping means are connected, mounted for reciprocal motion on the column, and
   means mounted on said column responsive to the detecting means for driving the sleeve upwardly on the column, wherein the emerging core is gripped and lifted clear of the furnace.

7. Apparatus as in claim 5, wherein:
the drive assembly is operable to impart rotary motion to the cores as they are advanced through the furnace.

8. Apparatus as in claim 5, wherein:
the rectilinear movement imparted to a core by the drive assembly is coordinated with the feeding assembly cycle such that the latter assembly feeds a core to the drive assembly each time the drive assembly advances a core thereon one core length, the succession of cores being driven through the treatment compartment in successive abutting relationship.

9. Apparatus as in claim 8, wherein:
each core has a passageway therein, and
a pin is removably mounted in one end of the passageway of each core with a portion of the pin protruding past the end of the core, whereby the protruding portion of the pin of a succeeding core may be inserted into the passageway of the preceding core when the succeeding core is inserted into the drive assembly.

10. In a vertically mounted carbon deposition furnace wherein a succession of cores are advanced upwardly therethrough, apparatus for removing the carbon coated cores emerging from the top thereof, which comprises:
a column rotatably mounted in parallel spaced relationship with the furnace,
a sleeve mounted for reciprocal motion on the column,
jaw means mounted on said sleeve operable to be moved into gripping engagement with a coated core emerging from the top of the furnace,
photoelectric detecting means mounted on the furnace operable to detect when a core emerging therefrom has reached a predetermined point,
first means responsive to the detecting means for activating the core gripping means,
second means responsive to the detecting means for driving the sleeve upwardly on the column a predetermined distance, wherein, upon activation of the detecting means, the core gripping means is operable to lift a coated core clear of the furnace, and
circuit means responsive to the sleeve being driven upwardly said predetermined distance operable to, in succession, rotate the column a predetermined angle, causes the sleeve to be driven down the column, and de-activate the core gripping means to release a coated core into a collection area.

References Cited

UNITED STATES PATENTS

| | | | |
|---|---|---|---|
| 2,247,864 | 7/1941 | Tiedemann | 214—338 |
| 2,316,117 | 4/1943 | Tilley | 214—338 |
| 2,445,822 | 7/1948 | Briechle | 219—10.69 |
| 2,591,259 | 4/1952 | Hess | 263—6 |
| 2,696,324 | 12/1954 | Jones | 221—154 X |
| 3,017,852 | 1/1962 | Bauer | 118—49.5 |
| 3,250,694 | 5/1966 | Maissel et al. | 118—49 X |
| 3,314,395 | 4/1967 | Hemmer | 118—49 |

FOREIGN PATENTS

| | | |
|---|---|---|
| 1,326,679 | 4/1963 | France. |
| 724,020 | 2/1955 | Great Britain. |

MORRIS KAPLAN, *Primary Examiner.*

Disclaimer 3,381,657.—*Walter L. Johnson*, Plaistow, N.H. CARBON DEPOSITION FURNACE. Patent dated May 7, 1968. Disclaimer filed June 9, 1969, by the assignee, *Western Electric Company, Incorporated.*
Hereby enters this disclaimer to claims 2 and 7 of said patent.
[*Official Gazette July 15, 1969.*]